United States Patent
Kuang et al.

(10) Patent No.: US 7,292,917 B2
(45) Date of Patent: Nov. 6, 2007

(54) METHOD FOR ATTENUATING VIBRATIONS IN A HYBRID ELECTRIC VEHICLE POWERTRAIN

(75) Inventors: Ming Kuang, Canton, MI (US); Fazal Syed, Canton, MI (US); Paul Niessen, Plymouth, MI (US); Michael Tiller, Canton, MI (US); Prabhakar Patil, Southfield, MI (US); Sunny Khosla, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 11/161,101

(22) Filed: Jul. 22, 2005

(65) Prior Publication Data

US 2006/0030979 A1 Feb. 9, 2006

Related U.S. Application Data

(60) Provisional application No. 60/590,464, filed on Jul. 23, 2004.

(51) Int. Cl.
*G06F 19/00* (2006.01)

(52) U.S. Cl. .................. 701/22; 701/54; 180/65.2; 180/65.3

(58) Field of Classification Search .................. 701/22, 701/51, 54; 180/65.1–65.4, 65.6–65.8
See application file for complete search history.

(56) References Cited

U.S. PATENT DOCUMENTS

| | | | |
|---|---|---|---|
| 6,232,733 B1 | 5/2001 | Obayashi et al. | |
| 6,247,437 B1 | 6/2001 | Yamaguchi et al. | |
| 6,278,195 B1 | 8/2001 | Yamaguchi et al. | |
| 6,441,506 B2 * | 8/2002 | Nakashima | 290/40 C |
| 6,621,244 B1 | 9/2003 | Kiyomiya et al. | |
| 6,622,805 B2 * | 9/2003 | Nakashima | 180/65.2 |
| 6,840,341 B2 * | 1/2005 | Fujikawa | 180/65.2 |
| 2003/0045988 A1 | 3/2003 | Suzuki et al. | |
| 2004/0112654 A1 | 6/2004 | Kozarekar et al. | |
| 2005/0061564 A1 | 3/2005 | Kuang et al. | |
| 2005/0167170 A1 * | 8/2005 | Hisada et al. | 180/65.2 |
| 2006/0025906 A1 * | 2/2006 | Syed et al. | 701/22 |

* cited by examiner

*Primary Examiner*—Gary Chin
(74) *Attorney, Agent, or Firm*—David B. Kelley; Brooks Kushman P.C.

(57) ABSTRACT

A method is disclosed for attenuating vibrations of an engine in a hybrid electric vehicle powertrain having a subsystem comprising an electric motor, a generator and a battery. Engine torque is coordinated with motor torque during engine start events and engine stopping events using gearing that defines in part separate torque flow paths for the engine and the motor. A filtered motor speed is used to compute active motor torque damping.

10 Claims, 6 Drawing Sheets

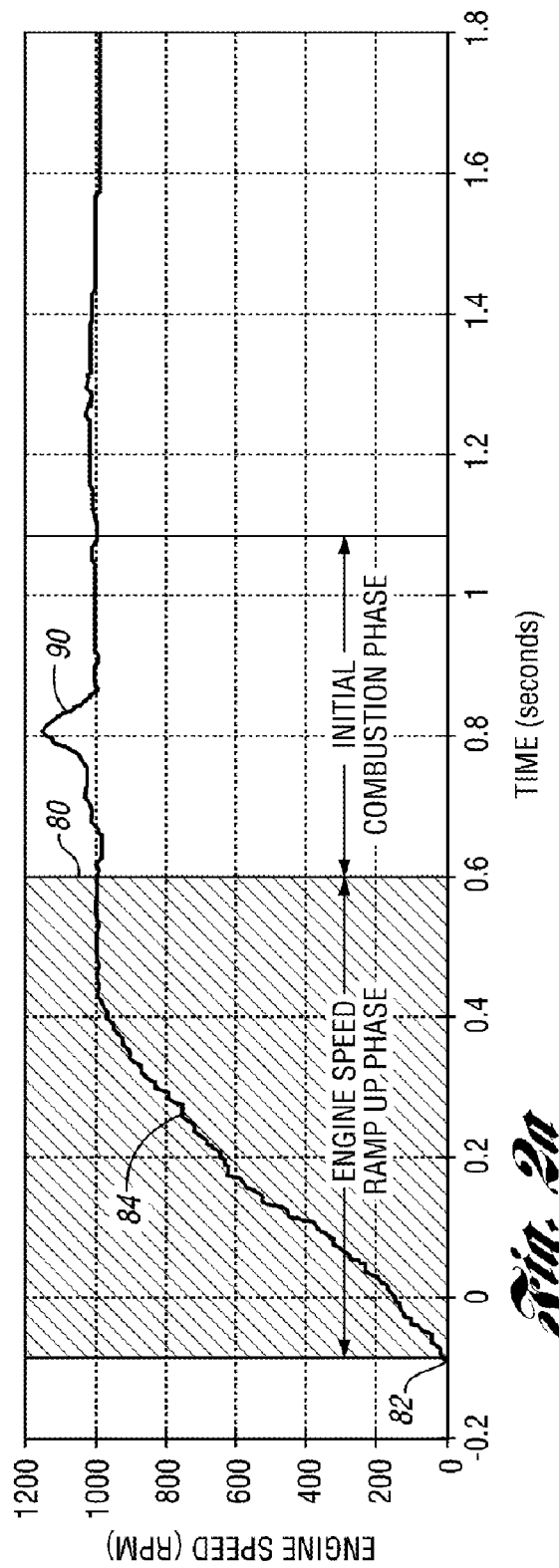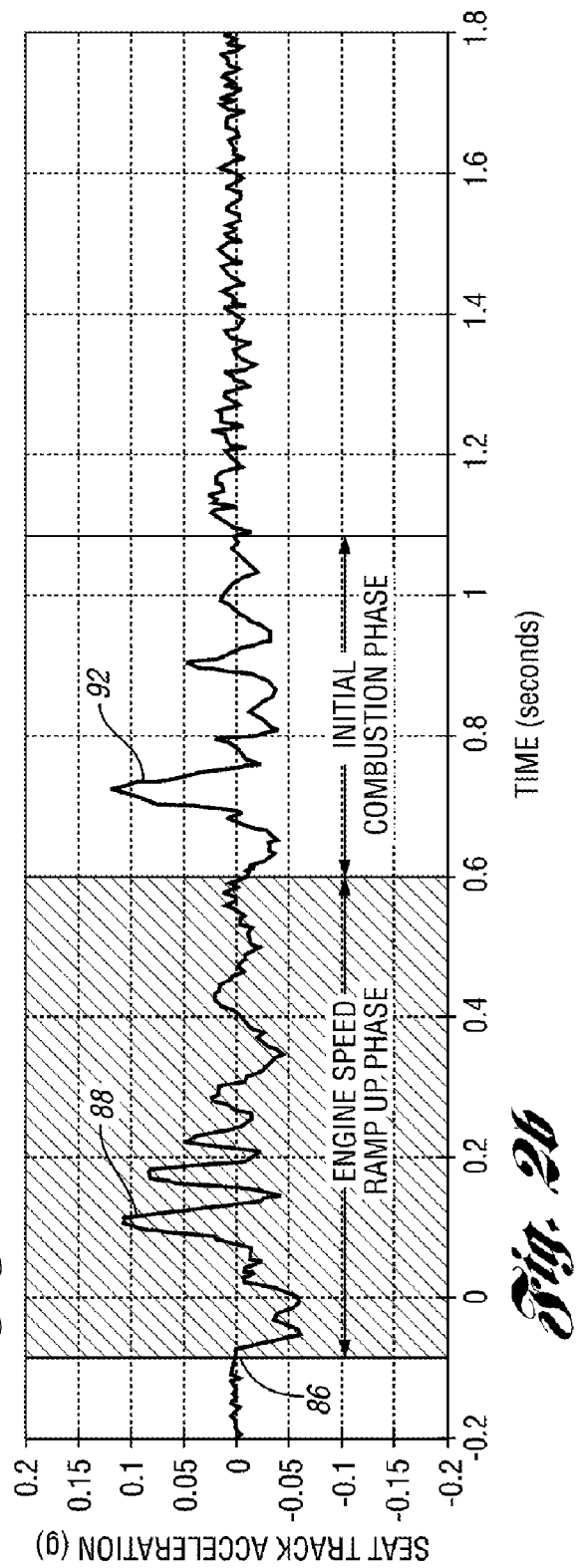

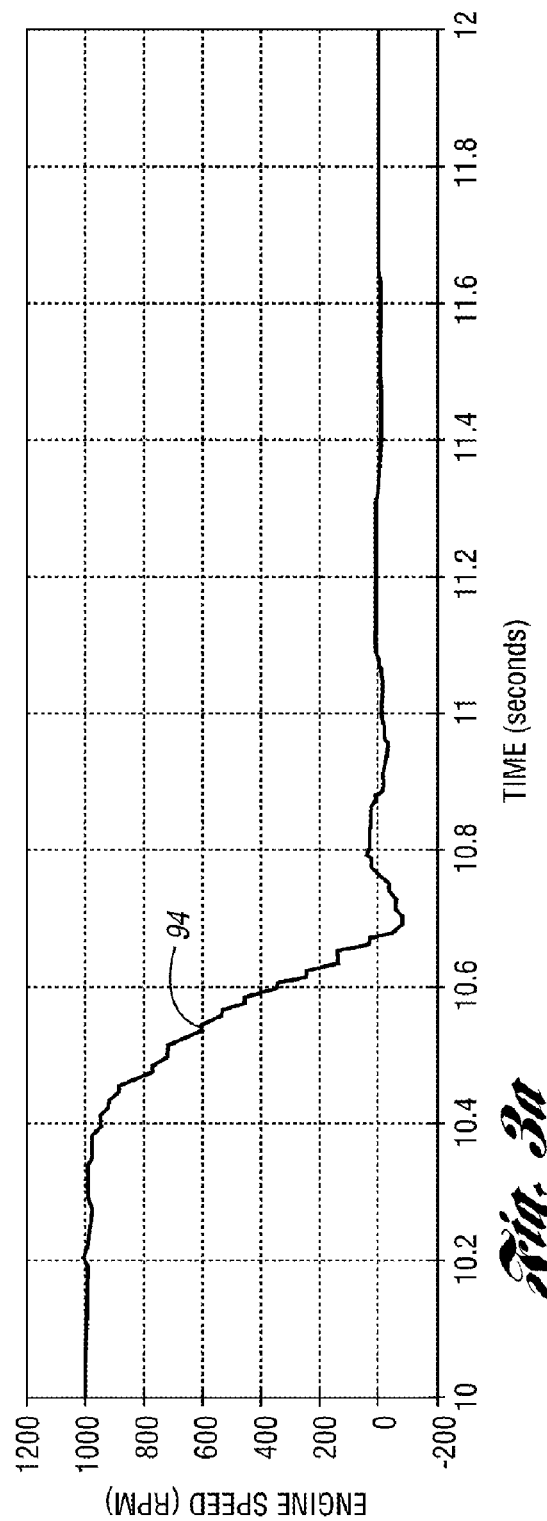
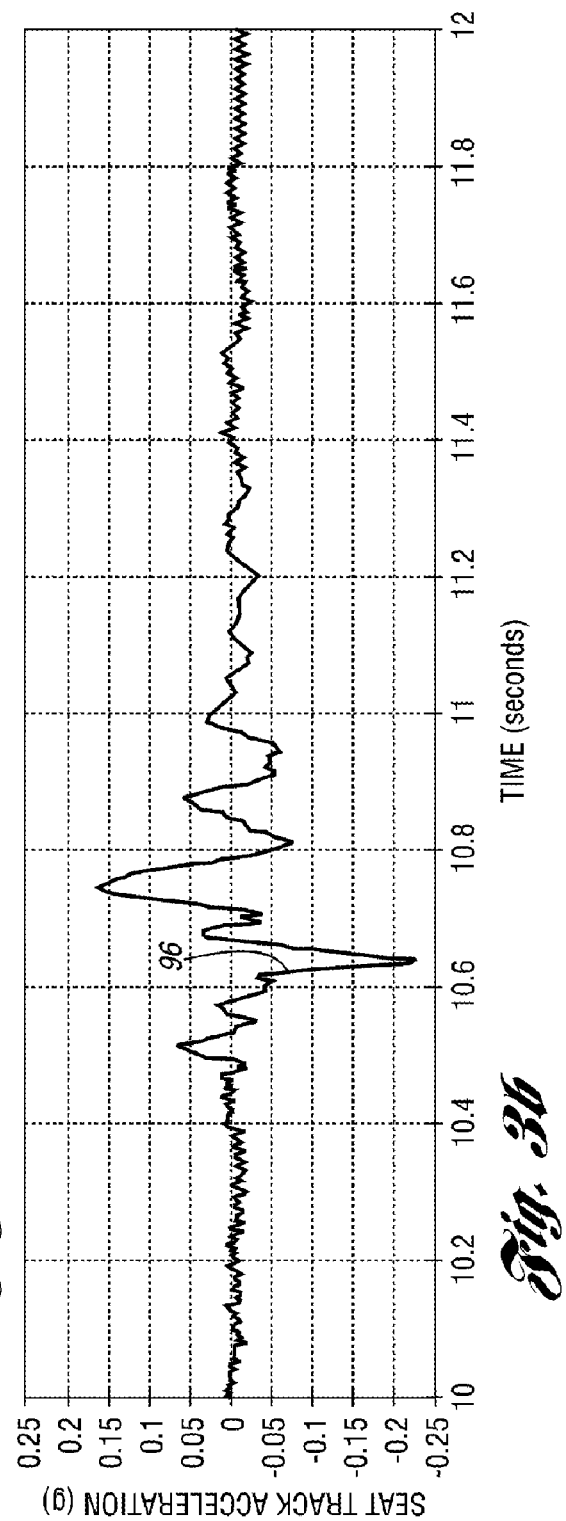

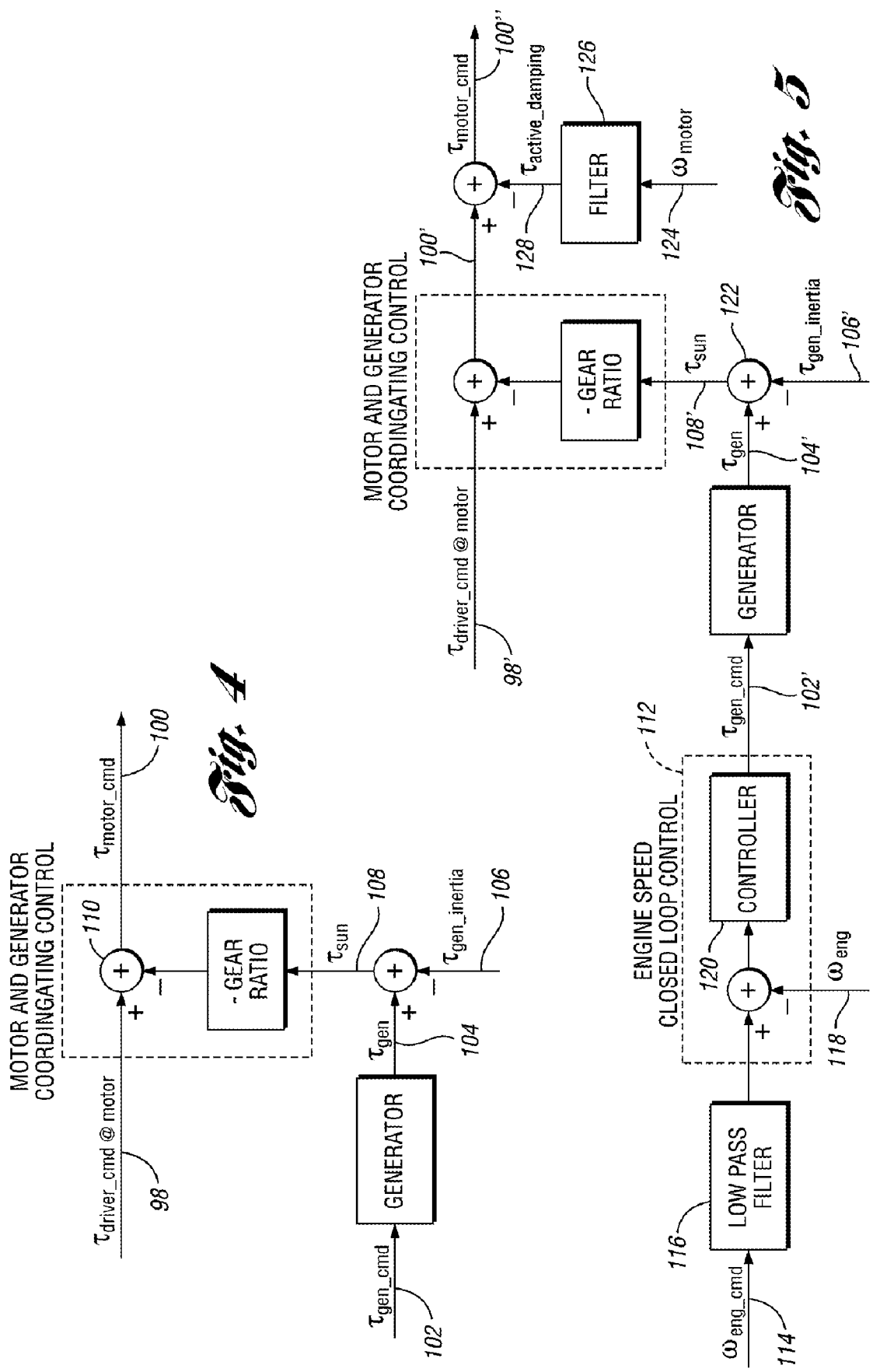

METHOD FOR ATTENUATING VIBRATIONS IN A HYBRID ELECTRIC VEHICLE POWERTRAIN

CROSS-REFERENCE TO RELATED APPLICATIONS

This application claims the benefit of U.S. provisional application Ser. No. 60/590,464 filed Jul. 23, 2004.

BACKGROUND OF THE INVENTION

1. Field of the Invention

The invention comprises a method for managing power flow in a hybrid electric vehicle powertrain with a primary power source and an electric motor power source wherein primary power source vibrations during starting and stopping are attenuated.

2. Background Discussion

In a hybrid electric vehicle powertrain such as that disclosed in co-pending U.S. patent application Ser. No. 10/605,313, filed Sep. 22, 2003, entitled "A Controller and Control Method for a Hybrid Electric Vehicle Powertrain," which is assigned to the assignee of the present invention, an electric motor and an engine are used to distribute power through transmission gearing to vehicle traction wheels. The gearing establishes plural power flow paths from the engine to vehicle traction wheels, a reaction element of the gearing being drivably connected to a generator in a battery-motor-generator electric power source configuration. The generator and the engine in this configuration are mechanically coupled through the gearing. The battery acts as an energy storing medium for the generator and the motor.

In one operating mode, the engine, which acts as a primary power source, will develop driving torque in a forward direction as the generator establishes a reaction torque. In the alternative, reaction torque can be established by a generator brake during fully mechanical engine drive.

Because of the characteristics of the planetary gearing in a powertrain configuration of this type, the engine speed can be considered to be decoupled from the vehicle speed, the engine speed being determined by a generator speed control. This results in divided power delivery paths, a first being a mechanical path from an engine torque output element and a second being an electrical path in which electrical power is distributed to the motor to which the generator is electrically coupled. Because of the decoupling of the functions of the electrical power flow path and the mechanical power flow path, the transmission consisting of the motor, the generator and the gearing, can be regarded as having power delivery characteristics similar to that of a conventional continuously variable transmission (CVT).

In a powertrain configuration of this type, in which the motor is a secondary power source, the electric motor draws power from the battery and provides propulsion independently of the engine, thus driving the vehicle in either a forward direction or a reverse direction. Further, the electric motor can provide electrical braking torque and recover vehicle kinetic energy during vehicle braking. That kinetic energy, in a conventional powertrain without hybrid characteristics, would otherwise be lost in the form of heat. The recovered vehicle kinetic energy of a hybrid electric vehicle powertrain can be used to charge the battery. Further, the generator can act as a motor using battery power while a one-way coupling for the gearing serves as a reaction member, whereby the vehicle can be propelled in a forward direction.

The primary power source and the secondary power source can simultaneously propel the vehicle in a forward direction to meet the driver's demand for torque and to achieve better acceleration performance.

Conventional CVT powertrains for vehicles make it possible to achieve better fuel economy and to reduce undesirable engine exhaust gas emissions by operating the engine in its most efficient speed and torque operating region whenever possible. Hybrid powertrains of the kind discussed in the preceding paragraphs have a potential for improving fuel economy and for reducing undesirable exhaust gas emissions even more effectively compared to conventional CVT powertrains equipped vehicles. This is due to the fact that the engine size can be reduced while providing the same vehicle performance resulting from the use of two power sources. It is due also to the fact that engine operation can be better optimized since the engine can be stopped if the required engine operating conditions are not favorable for high fuel economy and reduced undesirable exhaust gas emissions. Further, as previously mentioned, the regenerative kinetic energy developed during vehicle engine braking can be captured and stored in the battery.

In order to integrate the dual power sources to work together seamlessly to achieve improved performance, fuel economy and reduced undesirable engine exhaust gas emissions, coordination of the control of the power sources is needed. This control is achieved, as disclosed in the co-pending patent application identified above, by using a hierarchal vehicle system controller to control and manage power distribution from each of the two power sources. Under normal powertrain operating conditions, when the powertrain sub-systems and components are functional, the vehicle system controller will interpret a driver demand for acceleration or deceleration and then determine the traction wheel torque command based on the driver demand within predetermined powertrain power limits, including battery power limits. Further, the vehicle system controller determines when and how much power each power source needs to provide in order to meet the driver's demand and to achieve the specified vehicle performance; i.e., fuel economy, reduced undesirable engine exhaust gas emissions, drivability, etc. Thus, the vehicle system controller will determine when the engine must be turned off and when it must be turned on. It determines also the engine speed and engine torque operating point for any given power demand when the engine is operating.

One of the measures that can be taken to achieve better fuel economy and to reduce undesirable engine exhaust gas emissions in a hybrid electric vehicle powertrain, as previously explained, is to shut off the engine when the engine cannot be operated in its desired efficient operating region; for example, when the vehicle is stopped at a traffic light during vehicle operation in urban regions. As a result, the engine in the hybrid electric vehicle powertrain, unlike a conventional powertrain in which the engine must be started in a first start-up of the vehicle and shut off only by an ignition key, will be started and stopped relatively frequently during normal urban driving. These hybrid electric vehicle engine start and stop events can be unexpected to a driver. Thus, they are required to be imperceptible.

It is desirable for an engine start to be free of oscillatory seat-track acceleration. In reality, an engine start will tend to cause undesirable vibrations characterized by harshness. Such vibrations and harsh powertrain operating events may occur in two separate phases, where they are perceptible to a driver. The first phase is an engine speed ramp-up or cranking phase. The second is an initial engine combustion phase. These two separate phases are caused by two vibration sources, the first being the compression forces in the engine cylinders during engine speed ramp-up and the second being abrupt initial combustion forces during an engine start.

During the engine cranking phase, the generator in a powertrain of the type disclosed in the co-pending application provides a cranking torque to ramp-up the engine to achieve engine start or engine ignition, which results in cylinder compression forces. These compression forces and inertia forces caused by reciprocating motion of engine pistons can excite the engine's natural torsional vibration mode. If the engine speed is not controlled properly, natural torsional vibration frequencies are noticeable to the vehicle driver as the vibrations pass through an engine torsional resonance range. This can cause engine block "shaking" as well. Further, the generator cranking torque, when the engine is being cranked by the generator acting as a motor, is transmitted through the driveline because of the mechanical connection between the generator and the vehicle traction wheels. This cranking torque can excite the driveline natural torsional vibration mode. Similarly, in the initial combustion phase of an engine start-up event, the abrupt initial engine combustion torque can excite the engine's torsional vibration mode as well as the driveline torsional vibration mode.

The cylinder compression forces can be experienced also during engine ramp-down as the engine is shut off by the vehicle system controller.

The resonant vibrations of the engine and the driveline and the "shaking" of the engine result in vehicle body vibrations and harshness transmitted through powertrain mounts in the vehicle chassis.

U.S. Pat. No. 6,247,437 discloses a hybrid electric vehicle powertrain with an engine and two motors that cooperate with a planetary torque splitter gear unit. The controller used in managing power flow from the engine and the motors defines a generator torque command profile for starting the engine.

As in the case of the powertrain of the co-pending patent application, the generator of the powertrain of the '437 patent is used to provide engine starting torque. The torque profile varies based upon whether the engine is cold. The controller is an open loop control for managing engine speed as a driver torque command is applied for engine starting. There is no feedback closed-loop feature to compensate for uncertain operating conditions that can result in undesired engine start-up vibrations. Further, there is a subsequent transition to a speed feedback closed-loop control after the engine is started. This transition from an open-loop control to a closed-loop feedback control, in itself, can introduce undesirable engine vibrations and harshness during the initial combustion period.

Another example of a hybrid electric vehicle powertrain using an engine, two motors and a planetary gear unit for establishing plural torque flow paths from the motors and the engine to vehicle traction wheels is disclosed in U.S. Pat. No. 6,278,195. This patent describes a generator torque command profile to ramp-down engine speed during engine shut-off in a manner similar to the open-loop control of the '437 patent. The '195 patent does not deal with the possibility that the engine could be subjected to an instantaneous reverse driving torque during engine stops. There is no compensation for a torque reversal that can take place because of engine vibrations. Furthermore, there is no active damping in either the '195 patent or the '437 patent to suppress driveline oscillations during engine stops and starts.

BRIEF DESCRIPTION OF AN EMBODIMENT OF THE INVENTION

An objective of the present invention is to minimize vibrations and harshness in a hybrid electric vehicle powertrain during engine starts and engine stops and to minimize the vibrations at the vibration source during engine cranking, during initial combustion and during engine rampdown. This is done by suppressing any driveline oscillations initiated by the vibration source by controlling how the engine speed is ramped and by suppressing powertrain oscillations using active motor damping.

The generator, as in the case of the construction of the co-pending patent application, is required to provide a cranking torque to ramp up the engine speed for an engine start. This cranking torque determines the engine start vibration level. The inertia torque of the generator, due to the acceleration or deceleration of the generator mass, will be reflected to the torque output element of the gearing due to the mechanical property of the gearing in the divided power flow path defined by the gearing. This reflected torque will tend to apply an instantaneous reverse torque to the vehicle traction wheels. The motor then will provide an equal amount of torque at the driven wheels to compensate for this reflected torque so that driving torque fluctuations are attenuated. This is done by coordinating torque control between the motor and the generator.

During an engine stop, the generator will provide a torque load on the engine to ramp down the engine speed. The manner in which the ramping down occurs affects engine vibration and harshness during engine stops. The motor is required to compensate for the torque reflected from the ramp down engine torque by applying an instantaneous reverse vehicle driving torque at the vehicle traction wheels.

The generator torque that is required to ramp-up the engine during engine start-ups and to ramp-down the engine during engine stops is determined by a closed-loop control on the engine speed using actual engine speed as a feedback variable. The generator using closed-loop control thus can control engine speed.

A closed-loop control can be used also to control generator speed because a generator speed command can be derived from an engine speed command, the actual motor speed being based on the kinematics of the gearing.

Proper engine speed commands are needed for purposes of closed-loop control. During engine starts and engine stops, engine torsional resonance could be excited if engine speed passes through an engine resonant frequency region slowly (i.e., between 200-400 rpm). The engine speed command issued by the vehicle system controller generates an engine reference speed for purposes of the closed-loop control so that the engine speed quickly passes the resonant frequency range of the engine, thereby minimizing the magnitude of torsional vibrations. Further, the engine speed is not commanded to operate at a slower speed when the ambient temperature is cold and the vehicle battery capacity is low.

The method of the invention also provides an active damping torque in determining motor torque command as the motor torque suppresses driveline oscillations.

BRIEF DESCRIPTION OF THE DRAWINGS

FIG. 2a is a time plot of engine speed during an engine speed ramp-up phase and during an initial combustion phase during an engine start event;

FIG. 2b is a time plot of vehicle seat track acceleration during the engine speed ramp-up phase illustrated in FIG. 2a and during the initial combustion phase illustrated in FIG. 2a;

FIG. 3a is a time plot of vehicle engine speed during an engine stop event;

FIG. 3b is a time plot of seat track acceleration during an engine stop event;

FIG. 4 is a diagram illustrating the relationship of a generator torque command and a motor torque command by a driver as motor torque and generator torque are coordinated to produce an effective motor torque command;

FIG. 5 is a schematic diagram illustrating engine speed closed-loop control for developing a generator torque used for purposes of motor torque and generator torque coordination;

DESCRIPTION OF AN EMBODIMENT OF THE INVENTION

Figure 1:
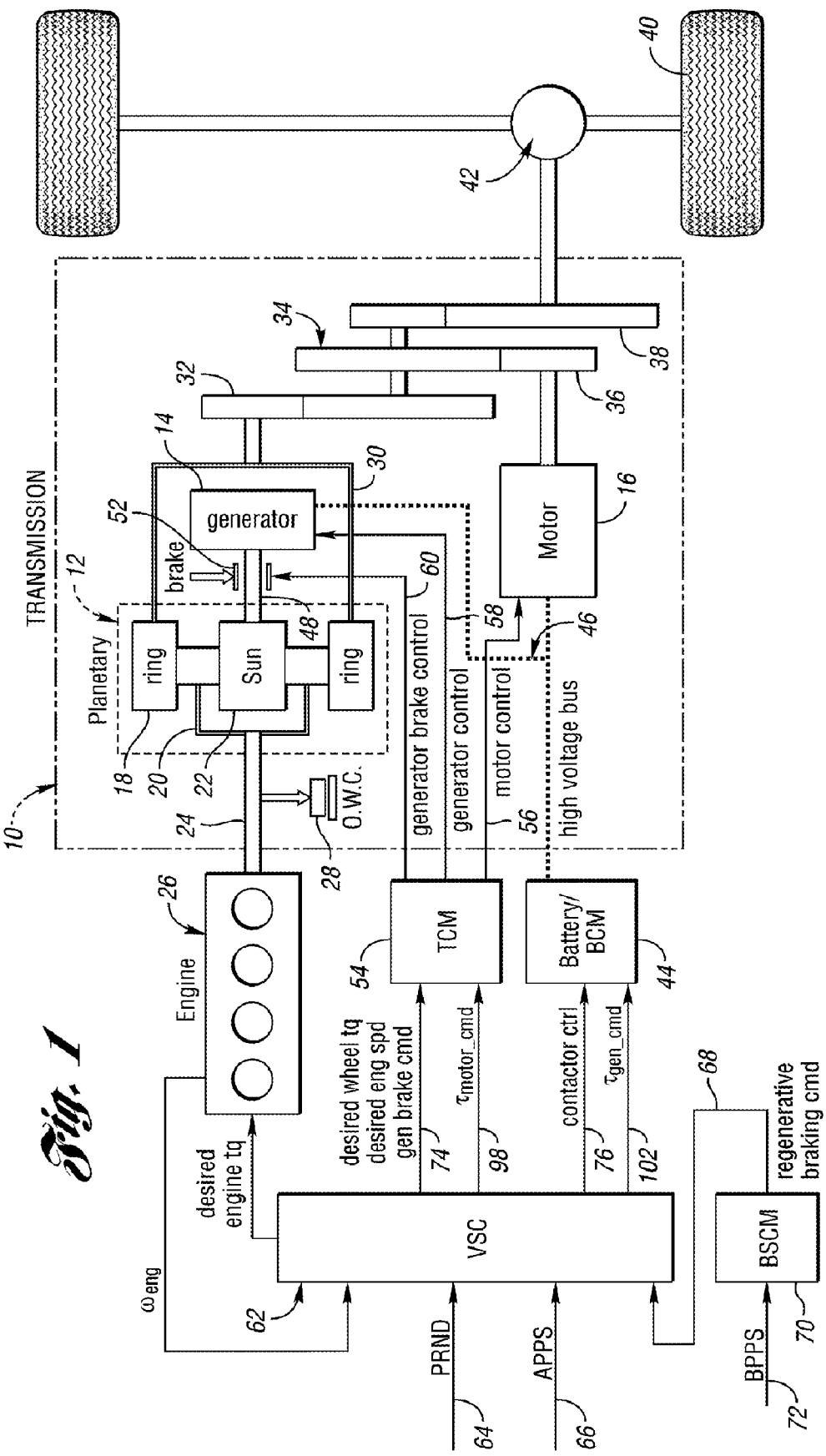
FIG. 1 shows an overall schematic diagram of a hybrid electric vehicle powertrain capable of embodying the invention.

FIG. 1 shows a schematic diagram of a hybrid powertrain for an automotive vehicle. It comprises a transmission 10 having a planetary gear unit 12, an electric generator 14, and an electric motor 16, which may be a high voltage induction motor. The planetary gear unit 12 consists of a ring gear 18, a planetary carrier 20, which rotatably supports planetary pinions, and a sun gear 22. The planetary pinions drivably engage sun gear 22 and ring gear 18. Carrier 20 is connected drivably to an engine driven shaft 24 for an internal combustion engine 26. An overrunning coupling 28 may be used to prevent reverse rotation of the shaft 24 while accommodating forward driving motion of the shaft 24.

Ring gear 18 is connected by torque transfer element 30 to torque input gear 32 of torque transfer countershaft gearing 34. Motor 16 is mechanically coupled to motor driven torque input gear 36 for the countershaft gearing 34. Gear 38, driven by the countershaft gearing 34, is connected drivably to the vehicle traction wheels 40 through a differential-and-axle assembly 42.

Motor 16, generator 14 and battery control module 44 are electrically coupled through a high voltage bus, schematically shown at 46.

The sun gear and the generator are mechanically coupled through shaft 48. Shaft 48 can be braked by a mechanical brake 52, which anchors the sun gear 22 and the generator 14 during one operating mode in which the engine output power is distributed through a mechanical power flow path only.

The transmission is under the control of a transmission control module 54, which issues command signals to the transmission. These signals are separately identified in FIG. 1 as a motor control signal at signal flow path 56, a generator control signal at signal control path 58 and a generator brake control signal at signal flow path 60.

The engine, the transmission control module and the battery control module are under the supervisory control of a vehicle system controller 62. Controller 62 responds to a driver signal at 64, which indicates the driver's selection of PRND (park, reverse, neutral, drive) modes. It responds also to an accelerator pedal position sensor signal at 66 and to a regenerative braking command signal at 68 developed by the regenerative braking control module 70 in response to a brake pedal position sensor signal at 72.

The vehicle system controller 62 responds to the input signals to issue a desired wheel torque command, a desired engine speed command and a generator brake command to the transmission control module 54, as shown at 74. It also responds to the control signals to issue a battery control module contactor switch signal 76 to activate or deactivate the module 44.

As previously mentioned, the generator, when it acts as a motor, can drive the sun gear. Engine starting torque, with the ring gear 18 acting as a reaction member, is developed during the engine speed ramp-up phase of an engine start event and during an initial combustion phase of an engine starting event. These two phases are illustrated in FIG. 2a, which is a time plot of engine speed. At time 80, shown in FIG. 2a, the engine speed ramp-up phase ends and the initial combustion phase begins. The engine ramp-up phase begins at a zero speed, as shown at 82.

The plot of FIG. 2a shows the engine speed ramp-up profile for an engine that does not include the improvements of the invention. The ramp-up phase is characterized by irregular speed change steps, as shown at 84, as the engine speed increases from zero to approximately 1,000 rpm. During the engine speed ramp-up phase, seat-track acceleration is developed as graphically illustrated in FIG. 2b. At the beginning of the engine start event, the seat-track acceleration is zero, as shown at 86. During the engine speed ramp-up phase of a typical starting event that does not include the features of the invention, seat-track acceleration peaks are established, as indicated at 88, until the ramp-up phase is completed.

During the initial combustion phase, which is later in the engine start event than the ramp-up phase, engine speed can be irregular, as shown by the speed irregularity in FIG. 2a at 90. It is during this phase that seat-track acceleration pulses are established, as shown by the peak values at 92. The seat-track acceleration pulses continue until the end of the initial combustion phase.

To obtain data for the plot of FIG. 2b, an accelerometer can be placed on the vehicle chassis at a fixed location, such as the seat track. Thus, the ordinate for the plot of FIG. 2b is identified as a seat-track acceleration plot. Seat-track acceleration forces would be perceptible to the driver.

FIG. 3a is a time plot of engine speed during an engine shut-down event, as the speed is reduced from 1,000 rpm to zero. Typically, in a control system that does not include the present invention, the engine speed is irregular, as shown by the engine speed steps at 94. As the engine speed is ramped-down from a time of 10 seconds to a time of 2.8 seconds, the corresponding seat-track acceleration experienced during an engine shut-down event is illustrated in FIG. 3b. As the engine speed ramps down, as shown at 94 in FIG. 3a, seat-track acceleration pulses, as explained previously, are developed. These are indicated by the acceleration plot peaks 96, shown in FIG. 3b. The larger peaks, shown in FIG. 3b, represent acceleration and deceleration values at the resonant frequencies for the powertrain. The resonant frequencies for the engine and for the driveline as a whole, as well as a so-called "shaking" of the powertrain, result in vehicle body vibrations and harshness through the powertrain mounts in the vehicle chassis, which are perceptible to the vehicle driver.

The present invention minimizes the vibrations illustrated in FIGS. 2b and 3b by suppressing driveline oscillations initiated by the vibration sources during engine cranking during initial combustion and during engine ramp-down. This suppression of the oscillations is achieved by active motor damping.

FIG. 4 illustrates a motor and generator torque coordinating control used in the present invention. A driver command for motor torque at 98 is developed by the vehicle system controller, which develops a motor torque command at 100 in FIG. 4. A generator torque command at 102 issued to the generator and the battery control module develops a generator torque at 104 in FIG. 4. The inertia of the generator rotor and the inertia of the sun gear, both of which have substantial mass, result in a generator inertia torque at 106, which is subtracted from the generator torque at 104 to produce an effective sun gear torque at 108. After taking into account the gear ratio in the transmission, the sun gear torque is combined at 110 with the driver command for motor torque to produce an effective motor torque command at 100.

FIG. 5 shows how the motor torque command is influenced by the closed-loop control of the invention. A generator torque command at 102' is developed by the engine speed closed-loop controller portion of the vehicle system controller, as shown at 112 in FIG. 5. The closed-loop controller receives an engine speed command from the vehicle system controller, as shown at 114. That value is distributed to a low pass filter 116, the output of which is distributed to the closed-loop controller 112. The filtered output is combined with actual measured engine speed, the closed-loop feedback variable, as shown at 118.

Engine speed thus is controlled in a closed-loop fashion at 120 to produce the effective generator torque command at 102'. This results in a generator torque 104', which is combined at 122 with generator and sun gear inertia torque at 106'. This results in an effective sun gear torque at 108'.

After sun gear torque is modified by the transmission gear ratio and combined with driver torque command at the motor, as shown at 98', a motor torque command 100' is produced. That motor torque command is further modified by the active damping torque feature illustrated in FIG. 5. This feature is characterized by an open-loop motor speed control in which actual motor speed is measured, as shown at 124, and filtered at 126 to produce an active motor torque damping value at 128. That value is combined with the motor torque command at 100' to produce an actual motor torque output command at 100". This motor torque command 100" attenuates the peak seat-track acceleration values shown in FIG. 3b during engine speed ramp-down. It also attenuates the seat-track acceleration values, as shown in FIG. 2b, during the engine speed ramp-up phase.

If desired, the characteristic shown in FIG. 5, wherein the engine speed is the feedback variable for the closed-loop control, could be changed so that a generator speed feedback variable would be used instead. This is because a generator speed command can be derived from an engine speed command, the actual motor speed being based on the kinematics of the gearing.

The engine speed command for the closed-loop controller reduces engine start and stop noise, vibration and harshness (NVH) because engine torsional resonance is avoided or reduced due to the fact that engine speed passes through the engine resonant frequency region quickly. The use of a low-pass filter is applied to a step engine command to generate the engine speed reference for the closed loop control. This method ensures that the engine speed passes its resonant range quickly to minimize torsional vibration (which results in poor engine start/stop NVH), and that the engine speed is not commanded slower when the ambient temperature is cold and the available battery capacity is low. This is because the magnitude of the step engine speed command under those operating conditions is lower; and the lower the magnitude, the slower the rise of the low-pass filter's output. The time constant of the low-pass filter can be varied depending on operating conditions. Under extreme cold temperatures or very low battery power limit conditions, slower filtering (larger time constant) is desired to ensure proper engine ramp-up for engine starts without violating battery limits.

The method of the invention applies an active-damping torque in determining the motor torque command to suppress any driveline oscillations. This active damping torque is determined by proper filtering of motor speed. Examples of this are a derivative with a gain or a lead-lag filter close to the origin of the coordinates; i.e., $$\tau = K \cdot \frac{d\omega}{dt}$$

Figure 6:
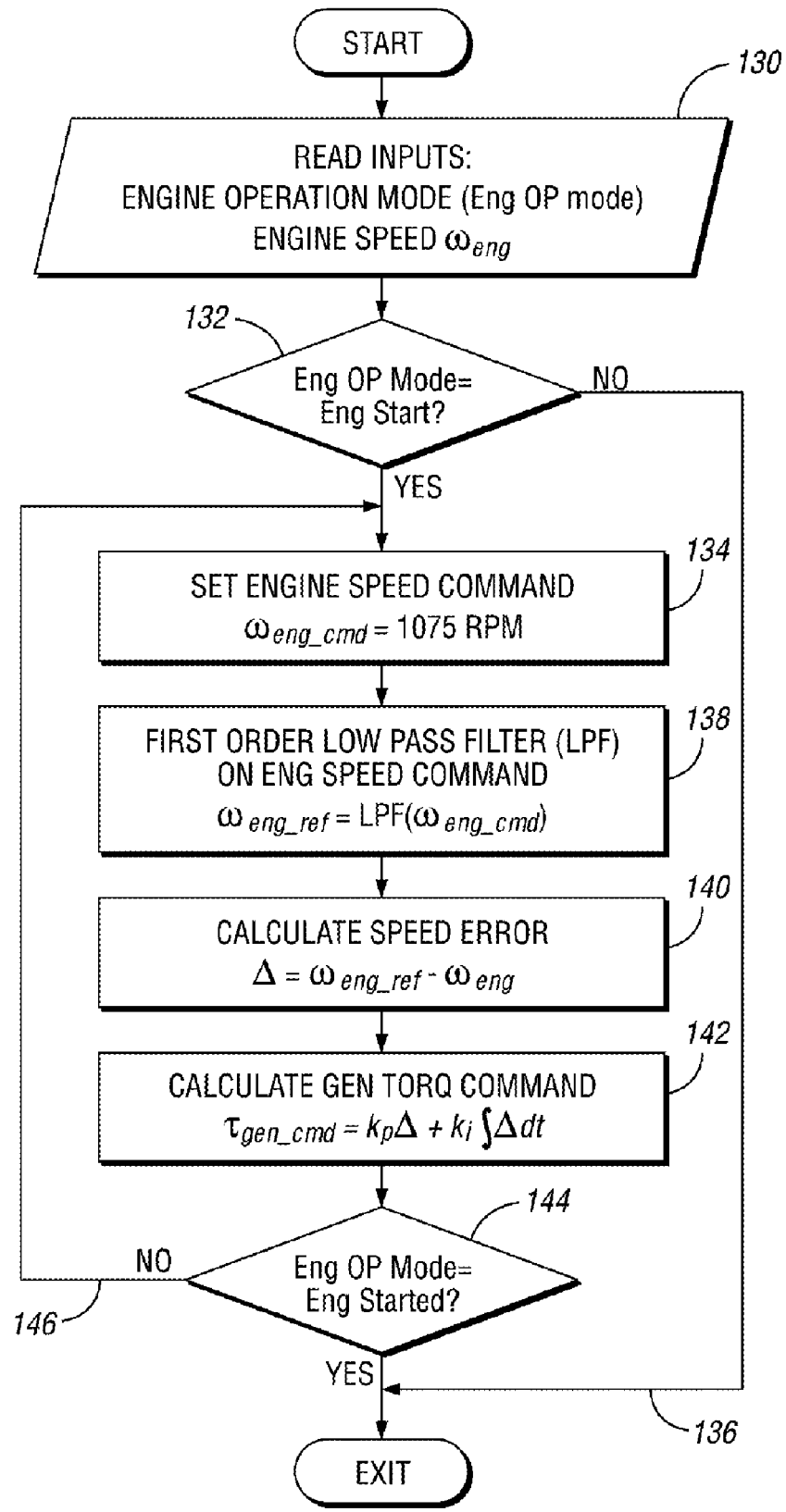
FIG. 6 is a flowchart illustrating the control strategy for determining generator torque during an engine ramp-up phase of an engine start event.
Figure 7:
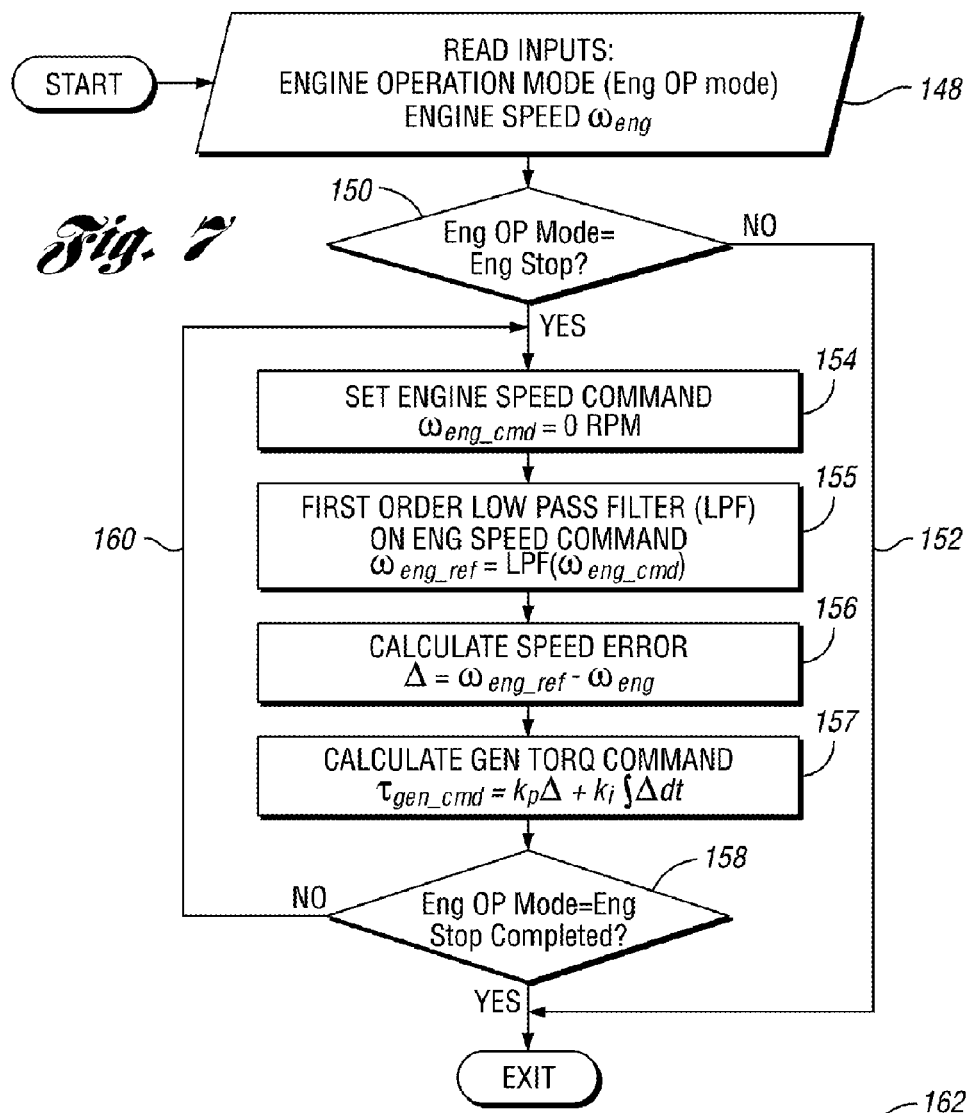
FIG. 7 is a flowchart show the strategy for generator torque determination for the engine ramp-down phase during an engine off event.
Figure 8:
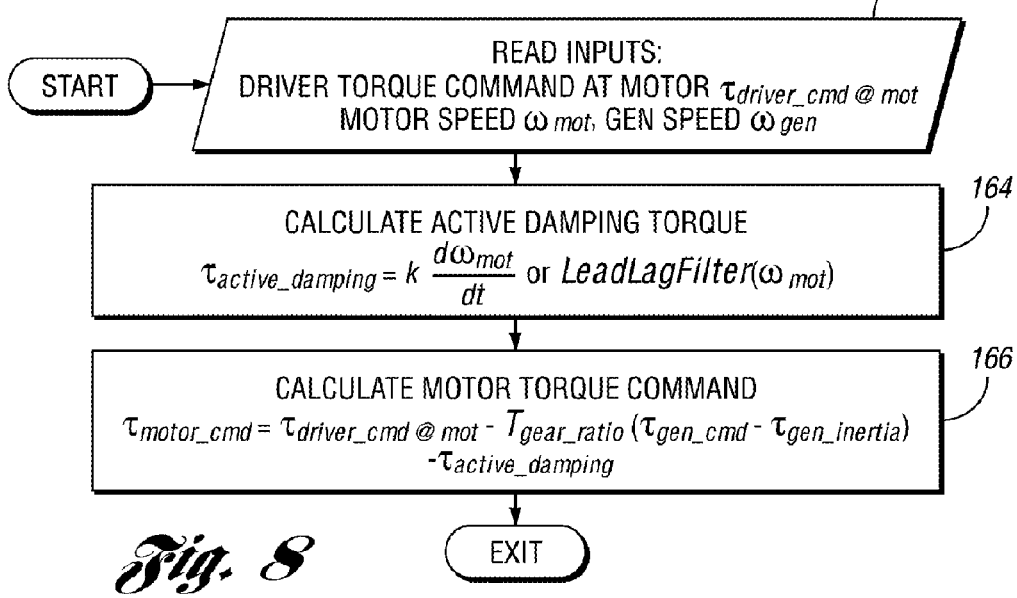
FIG. 8 is a flowchart showing the strategy for a motor torque determination during engine starts and engine stops.

The strategy used by the vehicle system controller in executing the functions described in the preceding paragraphs is illustrated in FIGS. 6-8. FIG. 6 shows the strategy for determining generator torque during an engine speed ramp-up phase of an engine start event. At action block 130, the controller reads inputs and stores them in the RAM portion of the memory of the vehicle system controller. These inputs include a determination of the operating mode and the engine speed. If the operating mode is an engine start mode, as determined at decision block 132, the routine will proceed to action block 134, where the engine speed command is set at a predetermined value, such as 1075 rpm. If the engine is not in an engine start mode, the routine will exit, as shown at 136.

Following the setting of the engine speed command at 134, the routine will proceed to action block 138, where the engine speed reference value is determined by the low pass filter 116, seen in FIG. 5. This value is used by the engine speed closed-loop control 112, seen in FIG. 5.

After the engine speed reference value is determined, a speed error is calculated at action block 140 by subtracting the actual engine speed from the reference engine speed.

The next step of the routine is a calculation of a generator torque command, as shown at 102' in FIG. 5. This is carried out at action block 142 in FIG. 6.

It is determined at decision block 144 whether the engine has started. If the engine has started, the routine is completed. If it has not started, the routine is repeated, as shown at 146.

The flowchart of FIG. 7 illustrates a strategy for determining generator torque during the engine ramp-down phase of an engine shut-down mode. The inputs for the controller are read at 148. These include reading the operating mode of the engine start and the actual engine speed. Using that data, it is determined at step 150 whether the engine operating mode is an engine shut-down mode. If it is not, the routine is completed, as shown at 152. If the engine shut-down mode is in place, the routine will proceed to set the engine speed command at zero rpm, as shown at action block 154. That step is followed by a determination of the engine reference speed at 112 in FIG. 5. This is done at action block 155 in FIG. 7.

At action block 156 in FIG. 7, the speed error for the controller 120 is determined. The routine then proceeds to action block 157 where the generator torque command is calculated by the controller 120. This may be a proportional-integral closed-loop control step, using engine speed as a feedback variable as indicated in FIG. 5, and using the proportional constant $K_p$ and the integral constant $K_i$ as indicated in FIG. 7.

The next step in the routine is at decision block 158, where it is determined whether the engine has stopped. If the engine has stopped, the routine is completed. If it has not stopped, the routine is repeated, as shown at 160.

FIG. 8 shows a control strategy for determining the motor torque command using the active motor torque damping feature illustrated in FIG. 5. The controller, at the beginning of the routine of FIG. 8, reads the inputs needed for determining the motor torque for an engine start and an engine stop. The driver torque command, shown at 98' in FIG. 5, is read at action block 162 of FIG. 8, as well as the motor speed and the generator speed. Generator speed is needed in the calculation of generator inertia torque, as seen at 106' in FIG. 5.

The next step in the routine involves calculation of active damping torque, as shown at action block 164. The active damping torque is equal to a damping constant K multiplied by a derivative of motor torque with respect to time, or a so-called "lead-lag" filtered motor speed, as previously mentioned. That step is followed by the step at action block 166 where the motor torque command, as shown at 100" in FIG. 5, is calculated. The motor torque command is determined as follows:

$$\text{motor\_cmd} = \text{driver\_cmd@mot} - T_{gear}\text{\_ratio}(\text{gen\_cmd} - \text{gen\_inertia}) - \text{active\_damping}$$

where:
  motor_cmd=commanded motor torque;
  driver_cmd@mot=the driver torque command at the motor;
  $T_{gear}$_ratio=the transmission gear ratio;
  gen_cmd=generator torque command;
  gen_inertia=generator inertia torque; and
  active_damping=active damping motor torque.

The particular embodiment of the powertrain system illustrated in FIG. 1 is representative of one hybrid electric vehicle powertrain configuration, but the invention is not limited in its application to a hybrid electric vehicle powertrain of the type shown in FIG. 1. It can be used in any of several hybrid electric vehicle powertrain configurations in which power sources, such as an engine and an electric motor, are used in separate power flow paths leading to vehicle traction wheels.

Although one embodiment of the invention has been disclosed, it will be apparent to persons skilled in the art that modifications may be made without departing from the scope of the invention. All such modifications and equivalents thereof are intended to be covered by the following claims.

What is claimed is:

1. A method for attenuating vibration in a primary rotary power source in a hybrid electric vehicle powertrain, the powertrain including a secondary rotary power source and gearing defining in part, respectively, separate torque flow paths from the primary and secondary power sources to vehicle traction wheels, the secondary power source including an electric motor electrically coupled to an electric generator, the generator being mechanically coupled to the primary power source, the method comprising the steps of:
  measuring actual speed of the primary power source;
  determining a primary power source speed command;
  determining a generator torque command based upon a closed loop control of primary power source speed using the actual speed of the primary power source as a feedback variable, the generator torque command corresponding to generator torque transmitted to an element of the gearing; and
  coordinating torque of the gearing element and a motor torque commanded by a vehicle driver to develop a coordinated motor torque command whereby engine speed and dynamic acceleration fluctuations during engine start events and engine stopping events are attenuated.

2. The method set forth in claim 1 wherein the primary power source is an engine mechanically coupled to the vehicle traction wheels;
  the motor being mechanically coupled to the vehicle traction wheels independently of the engine.

3. The method set forth in claim 1 wherein the generator torque transmitted to the element of the gearing is determined by developing a generator inertia torque value and combining the generator inertia torque value with the generator torque.

4. A method for attenuating vibration in a primary rotary power source in a hybrid electric vehicle powertrain, the powertrain including a secondary rotary power source and gearing defining in part, respectively, separate torque flow paths from the primary and secondary power sources to vehicle traction wheels, the secondary power source including an electric motor electrically coupled to an electric generator, the generator being mechanically coupled to the primary power source, the method comprising the steps of:
  measuring actual rotary speed of the primary power source;
  commanding a desired primary power source speed;
  measuring actual rotary speed of the electric motor;
  determining a primary power source speed command;
  determining a generator torque command based upon a closed loop control of primary power source speed using the actual speed of the primary power source as a feedback variable, the generator torque corresponding to torque transmitted to an element of the gearing;
  coordinating torque of the gearing element and motor torque commanded by the vehicle driver to develop a coordinated motor torque command;
  deriving an active damping torque for the electric motor as a function of the actual rotary speed of the electric motor; and
  combining the active damping motor torque and the coordinated motor torque command to develop an effective motor torque command whereby engine speed and dynamic acceleration fluctuations during engine start events and engine stopping events are attenuated.

5. The method set forth in claim 4 wherein the primary power source is an engine mechanically coupled to the vehicle traction wheels;
  the motor being mechanically coupled to the vehicle traction wheels independently of the engine.

6. The method set forth in claim 4 wherein the active damping torque is computed using a motor speed filter.

7. The method set forth in claim 6 wherein the motor speed filter is characterized by a differential of measured motor speed.

8. The method set forth in claim 4 wherein the generator torque transmitted to the element of the gearing is determined by developing a generator inertia torque value and combining the generator inertia torque value with the generator torque.

9. A method for controlling an engine in a hybrid electric vehicle powertrain, the powertrain including a subsystem comprising an electric motor, a battery and a generator, the powertrain having gearing defining in part, respectively, separate torque flow paths from the engine and the motor to vehicle traction wheels, the generator being mechanically coupled to the engine through the gearing, the method comprising the steps of:

measuring actual rotary speed of the engine;

measuring actual motor rotary speed;

determining an engine speed command;

determining a generator torque as a function of the engine speed command, the generator torque corresponding to torque transmitted to an element of the gearing whereby the gearing coordinates torque of the gearing element and motor torque commanded by a vehicle driver to develop a coordinated torque value; and computing an effective motor torque command based upon the coordinated torque value whereby engine speed and dynamic acceleration fluctuations during engine start events and engine stopping events are attenuated.

10. The method set forth in claim 9 wherein the effective motor torque command is computed by filtering the actual motor rotary speed to develop an active damping motor torque and combining the active damping motor torque with the coordinated torque value.

* * * * *